United States Patent [19]

Isono

[11] Patent Number: 4,856,844
[45] Date of Patent: Aug. 15, 1989

[54] CUSHIONING BODY OF A SEAT FOR VEHICLES

[75] Inventor: Hiroyuki Isono, Tokyo, Japan

[73] Assignee: Tachikawa Spring Co., Ltd., Tokyo, Japan

[21] Appl. No.: 656,153

[22] Filed: Sep. 28, 1984

[51] Int. Cl.$^4$ .............................................. A47C 3/00
[52] U.S. Cl. ................................. 297/284; 297/458; 297/DIG. 1; 297/DIG. 3
[58] Field of Search .......... 297/284, DIG. 3, DIG. 1, 297/DIG. 2, 458

[56] References Cited

U.S. PATENT DOCUMENTS

| | | | |
|---|---|---|---|
| 2,837,145 | 6/1958 | Goetz | 297/DIG. 1 |
| 3,101,217 | 8/1963 | Requa | 297/DIG. 1 |
| 3,193,328 | 7/1965 | Baermann | 297/DIG. 3 |
| 3,612,607 | 10/1971 | Lohr | 297/DIG. 1 |
| 3,663,057 | 5/1972 | Lohr et al. | 297/DIG. 1 |
| 3,983,640 | 10/1976 | Cardullo et al. | 297/DIG. 3 |
| 4,059,909 | 11/1977 | Kron | 297/DIG. 1 |
| 4,444,430 | 4/1984 | Yoshida et al. | 297/284 |

FOREIGN PATENT DOCUMENTS 0053524 3/1983 Japan .............................. 297/DIG. 3

Primary Examiner—Francis K. Zugel
Attorney, Agent, or Firm—Oldham & Oldham Co.

[57] ABSTRACT

A cushion body of a seat for vehicles is disclosed which comprises a main pad portion, front and back portions foldably, integrally connected with the corresponding forward and back edges of the main pad portion, and left and right side portions foldably, integrally connected with the corresponding left and right side edges of the main pad portion. All the pad portions are made of a foam material, and the front and back portions as well as the right and left side portions have superimposing surfaces for being superimposed on the upper surface of the main pad portion when each of those portions are folded over on to the main pad. A recessed portion is formed in one of the upper surface of the main pad portion and the superimposing surfaces of those front and back portions as well as left and right side portions, or both of all the upper surface and superimposing surfaces thereof, whereby an air bag is stored in the cavity formed by the recessed portion(s).

2 Claims, 1 Drawing Sheet

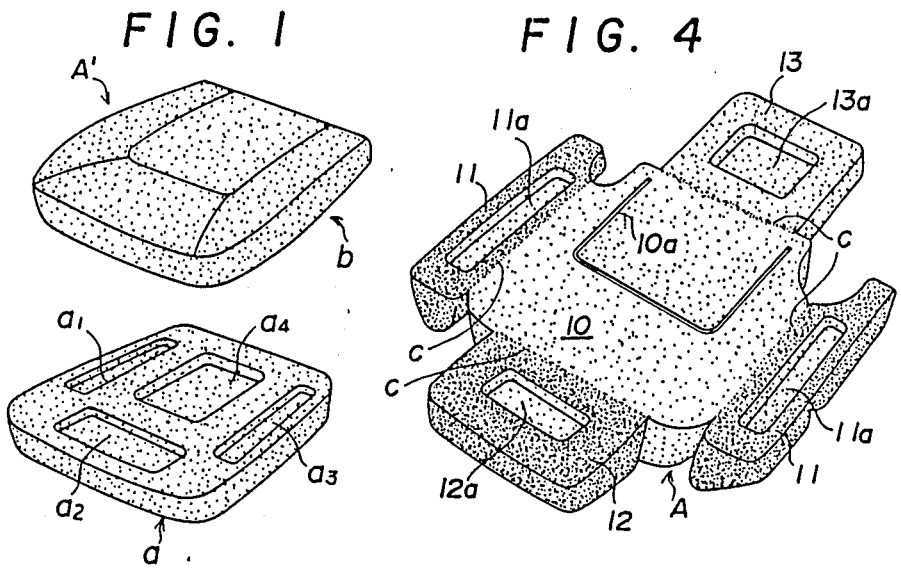
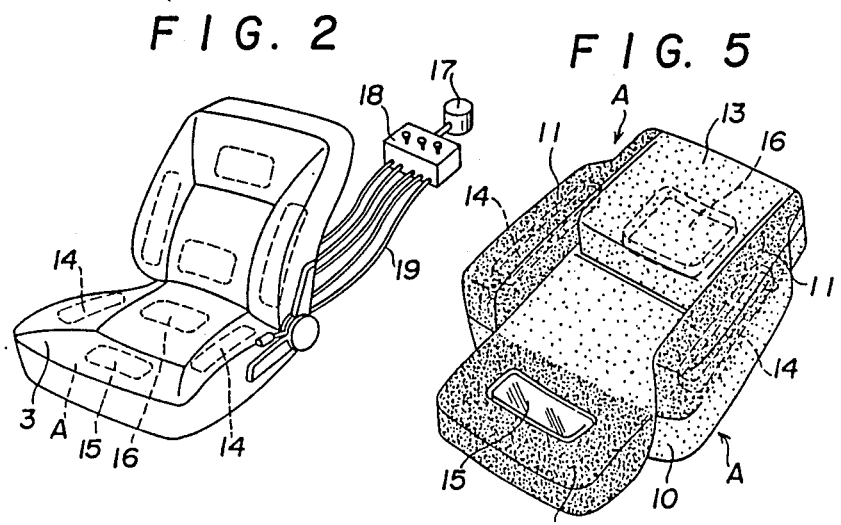
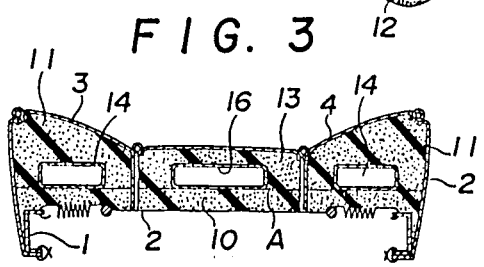

4,856,844

CUSHIONING BODY OF A SEAT FOR VEHICLES

FIELD OF THE INVENTION

The present invention relates to an improvement of a cushion body of a seat for vehicles which permits an occupant to adjust its cushioning force (or cushion retentivity) selectively in accordance with his or her physical figure.

BACKGROUND OF THE INVENTION

Hitherto, the cushion body of this type basically consists of an upper pad member, a lower pad member on which the upper pad member is superimposed, recessed portions formed in the upper surface of the lower pad member, and an air bag mounted within each of the recessed portions.

However, the separate two-pad structure of this conventional cushion body has suffered from difficulty in determining a precise position of the upper pad member relative to the lower pad member during the assembling process, thus detracting from its assembling efficiency. Furthermore this problem can result in the upper and lower pad members moving in directions opposite to each other, when the air bags in the lower pad member are expanded, thus leaving a difference in the relative position of the upper and lower pad members.

In order to obviate the above disadvantages of the conventional cushion body, it is a primary object of the present invention to provide a cushion body of a seat for vehicles such as those with air bag-containing recesses having structure which results in highly improved efficiency in assembly.

It is another object of the present invention to provide a cushion body having a structure which prevents the movement of the upper and lower pad members relative to each other due to the expansion of the air bags in the pad members, whereby no difference is caused in the relative position of the upper and lower pad members even when the air bags are expanded.

It is still another object of the present invention to provide a cushion body having an excellent retentivity for retaining its shape even with repeated use, and providing a good comfortable seating feeling to an occupant sitting thereon.

SUMMARY OF THE INVENTION

The above-mentioned objects of the present invention can be achieved by such cushion body comprising a main pad portion of a foam material, front and back portions of a foam material which are foldably, integrally connected with the corresponding forward and back edges of the main paid portion, respectively, left and right side portions of a foam material harder than that of the back portion on which an occupant'buttocks is positioned, which left and right side portions are foldably, integrally connected to the corresponding left and right side edges of the main pad portion, respectively, and a recessed portion for storing an air bag therein, which recessed portion is formed in one or both of the upper surfaces of the aforementioned main pad, front and back portions and left and right side portions. In this arrangement, each of the front and back portions and the left and right side portions can be superimposed onto the upper surface of the main pad portion. This cooperatively superimposed structure results in the above-mentioned objects.

BRIEF DESCRIPTION OF THE DRAWINGS

In the drawings:

FIG. 1 is an analytical perspective view of a conventional article;

FIG. 2 to FIG. 5 show one embodiment according to the present invention;

FIG. 2 is a perspective view showing the condition for use of a cushion body according to the present invention;

FIG. 3 is a sectional view transverse to the body direction thereof;

FIG. 4 is a perspective view of said cushion body prior to the assembly thereof; and FIG. 5 is a perspective view of the assembly state thereof.

DESCRIPTION OF THE PREFERRED EMBODIMENTS

First of all, a conventional cushion body will be described with reference to FIG. 1 for better understanding of the present invention.

The conventional cushion body consists of a lower pad member (a) and an upper pad member (b) to be superimposed on the lower pad member (a), and is constructed in such a manner that recessed portions $(a_1)$, $(a_2)$, $(a_3)$ and a recessed portion $(a_4)$ are each formed at a predetermined positions in the upper surface of the lower pad member (a) and flexible air bags (not shown) can be fitted into the recessed portions $(a_1)$, $(a_2)$, $(a_3)$, and also into the recessed portion $(a_4)$, respectively, after which the lower pad member (a) and upper pad member (b) are conjoined to hold the air bag(s) therebetween. The adjustment of a cushioning force of this cushion body is effected by controlling the volumetric flow of air being admitted into the air bags.

As previously described, this conventional structure of cushion body is based on the two separately formed pad members which causes a difficulty in determining a precise position of the upper pad member relative to the lower pad member during the assembling process. This results in a poor assembling efficiency, and, furthermore, creates a problem wherein the upper and lower pad members will easily move in a direction opposite to each other when the air bags in the pad member are expanded, with the consequence that a difference appears in the relative position of the upper and lower pad members.

Now, description will be made on the embodiment of the present invention with reference to FIGS. 2 to 5.

In summary, again, the aspects of the present invention for avoiding the defects as aforementioned are such that the cushion body (A) of the invention comprises a main pad portion (10) which corresponds to the lower pad member of the conventional one. Front (12), back (13), and left and right side portions (11) are each foldably, integrally connected to the corresponding edges of the main pad portion, whereby all the front and back portions as well as the left and right side portions can be folded and superimposed onto the upper surface of the main pad portion, thus cooperatively forming an upper pad portion on the main pad portion, which corresponds to the upper pad member (b) of the conventional one. In addition, since the left and right side portions (11) are made of a harder foam material than that of the back portion (13) on which an occupant's buttocks is positioned, the deformation of the cushion body per se is prevented whereby a comfortable seating feeling can be offered to an occupant sitting thereon.

FIG. 2 and FIG. 3 show a seat for vehicles employing the cushion body (A) of the present invention. The cushion body (A) is mounted on a spring member (2) extended within and secured to a seat frame (1) and is further covered with a top cover member (3). The peripheral edges of the cushion body (A) are secured to the seat frame (1) and the middle portion thereof is fixed to the spring member (2) by means of a hang cloth (4).

The cushion body (A) comprises a main paid portion (10) made of a foam material, front and back portions, (12) and (13), respectively, are made of a foam material and are integrally connected to the corresponding forward and back edges of the main pad portion (10), while the left and right side portions (11) formed in an elevated manner are also made of a foam material. The front and back portions (12), (13) and the left and right side portions (11) are so formed that they are integrally connected to the corresponding edges of the main pad portion (10) via a thin connecting portion (C). All those portions (10), (11), (12) and (13) are made of a foam material with different hardness, so that, depending on the desired effect, a particular arrangement of their combination can be made. For example, the back portion (13) may be made of a less hard foam material relative to that of the left and right side portions (11) so as to improve the shape retaining property of the cushion body (A). This particular arrangement is adopted as one embodiment of the present invention.

In the drawings, reference characters (11a), (12a) and (13a) represent recessed portions which are formed simultaneously with the formation of the respective portions (11), (12) and (13). Air bags (14), (15) and (16) can be inserted and stored in each of the recessed portions. The illustrated recessed portions are formed in the front and back portions (12), (13) and also in the left and right side portions (11). However, the recessed portions are not limited to this embodiment, but may be formed in the surface of the main pad portion (10), or may be formed in both of the upper surfaces of the main pad portion (10) and the surfaces of the front and back portions (12) and (13).

The air bags (14), (15) and (16) are made of a flexible hollow soft material (for example, a rubber material, a rubberized cloth, or the like). To each of the air bags (14), (15) and (16) is connected to a conduit (19) which is, in turn, connected to an air pump (17) and further to a valve (18) for controlling the volumetric flow of an air from the air pump (17) into the air bags.

In FIG. 4, reference character (10a) shows a slit for insertion of the hang cloth (4) thereinto.

Thus, the cushion body (A) according to the present invention may be so constructed that the air bags (14), (15) and (16) are stored into each of the recessed portions (11a), (12a) and (13a), after which the front and back portions (12) and (13) as well as the left and right side portions (11) (11) can be respectively folded at the connecting portion (C) and superimposed onto the upper surface of the main pad portion (10).

In the embodiments illustrated in the drawings, the upper surface of the main pad portion (10) and the superimposing surfaces of the front and back portions (11) and left and right side portions (12) and (13) are each formed in a plane form. But, it is important to note that those surfaces may be formed in a convex-concave manner so that the superimposing surfaces of those portions (11), (12) and (13) are in a mating serrated or gear-like engagement with the upper surface of the main pad portion (10). In this way, it is possible to prevent a space from being creating between the upper surface of the main pad portion (10) and the superimposing surfaces of the portions (11), (12) and (13) while the cushion body (A) returns to its original shape when released from the compressed state. Further, it is possible to prevent the movement of the front and back portions (12) and (13) relative to the main pad portion (10) due to the expansion of the air bags (14), (15) and (16).

From the above description, it will be appreciated that the present invention has the following advantageous effects: (1) it is possible to simply determine a precise position of the upper pad portions with respect to the lower pad main portion and therefore the assembling efficiency can be highly improved; (2) there is no possibility of the front and back portions being moved relative to the pad main portion, when the air bags in the portions are expanded; and (3) since the left and right portions are made of a harder foam material than that of the main pad portion, the cushion body as a whole retains its shape more positively and therefore it will not go out of shape. Furthermore, when seated, the left and right side pad portions are not pulled down toward the main pad portion, and therefore a good comfortable seating feeling can be offered to an occupant sitting thereon.

What I claim is:

1. A cushion body for a seat for vehicles which comprises:
    a main pad portion made of a foam material and having an upper surface;
    front and back portions made of a foam material and each having a superimposing surface, said front and back portions being each integrally connected with corresponding forward and back edges of said main pad portion and bendable therefrom, whereby said respective front and back portions can be folded at said corresponding forward and back edges with said superimposing surfaces thereof being superimposed on said upper surface of said main pad portion, said superimposed front and back defining a front pad portion and back pad portion on said main pad portion;
    left and right side portions made of a foam material and each having a superimposing surface, said left and right side portions being each integrally connected with corresponding left and right side edges of said main pad portion, and bendable therefrom, whereby said respective left and right portions can be folded at said corresponding left and right side edges with said superimposing surface thereof being superimposed on said upper surface of said main pad portion, said superimposed left and right portions defining a left side pad portion and right side pad portion on said main pad portion; and
    a recessed portion formed in one of all before said superimposing surfaces and said upper surface of said main pad portion, or in both of all before said superimposing surfaces and said upper surface of said main pad portion, said recessed portion being adapted to store an air bag therein.

2. The cushion body for a seat for vehicles according to claim 1, wherein said left and right side portion foam material is a harder foam material than said foam material of said back portion.

* * * * *